US008803359B2

(12) United States Patent
Boys

(10) Patent No.: US 8,803,359 B2
(45) Date of Patent: Aug. 12, 2014

(54) POWER CONTROL

(75) Inventor: John Talbot Boys, Auckland (NZ)

(73) Assignee: Auckland Uniservices Ltd, Auckland (NZ)

( * ) Notice: Subject to any disclaimer, the term of this patent is extended or adjusted under 35 U.S.C. 154(b) by 1069 days.

(21) Appl. No.: 12/734,486

(22) PCT Filed: Nov. 5, 2008

(86) PCT No.: PCT/NZ2008/000297
§ 371 (c)(1),
(2), (4) Date: Jan. 13, 2011

(87) PCT Pub. No.: WO2009/061219
PCT Pub. Date: May 14, 2009

(65) Prior Publication Data
US 2011/0116290 A1    May 19, 2011

(30) Foreign Application Priority Data
Nov. 5, 2007  (NZ) ........................... 563188

(51) Int. Cl.
*H02J 3/00*    (2006.01)
(52) U.S. Cl.
USPC .......................................................... 307/38
(58) Field of Classification Search
USPC .......................................................... 307/38
See application file for complete search history.

(56) References Cited

U.S. PATENT DOCUMENTS

| 4,291,264 A | 9/1981 | Siemon |
| 4,800,328 A | 1/1989 | Bolger et al. |
| 5,293,308 A * | 3/1994 | Boys et al. ...................... 363/37 |

FOREIGN PATENT DOCUMENTS

| JP | 2-23031 | 1/1990 |
| JP | 9-204240 | 8/1997 |
| JP | 200760829 | 3/2007 |
| JP | 2007195264 | 8/2007 |
| WO | 2004105208 | 12/2004 |
| WO | 2007100265 | 9/2007 |
| WO | 2007139401 | 12/2007 |

* cited by examiner

*Primary Examiner* — Hal Kaplan
(74) *Attorney, Agent, or Firm* — Law Office of Richard F. Jaworski PC

(57) ABSTRACT

A pick-up circuit for an inductive power transfer (IPT) system includes a series-tuned pick-up coil and a plurality of parallel AC processing circuits provided between the series-tuned pick-up coil and an output, each processing circuit being adapted to produce an output signal based directly or indirectly at least in part on a voltage of the series-tuned pick-up coil and including a switch for selectively coupling the processing circuit to the output so as to selectively provide the respective output signal to the output of the pick-up circuit.

19 Claims, 9 Drawing Sheets

POWER CONTROL

FIELD OF INVENTION

This invention relates to power control in inductive power transfer systems, particularly those involving high powers.

BACKGROUND TO THE INVENTION

Inductive power transfer (IPT) or inductively coupled power transfer (ICPT) systems are now an accepted form of industrial power supply chosen particularly for stringent environments. An example arrangement for an IPT system 1 is shown in FIG. 1. A track conductor 2 is energised with a current at a frequency typically in the range of 5 kHz to 50 kHz. A pick-up 3 with pick-up inductance $L_1$ intercepts some of the magnetic field created by the track current. The pick-up 3 is tuned with some form of track compensation 4 and the power output is rectified 5 and controlled by a switch-mode controller 6 to produce a DC output which may be used for a variety of purposes.

A good control technique for pick-ups has been found to be provided by decoupling as described in U.S. Pat. No. 5,293,308, which is assigned to the assignee of the present invention and incorporated herein by reference. An arrangement from U.S. Pat. No. 5,293,308 is shown in FIG. 2. Power control may be implemented using a single switch. The output power is directly proportional to (1-D), where D is the duty cycle of the switch. The switch may be switched at a high speed or slowly, depending on the capability of the switch and the requirements for the particular application. At fast switching speeds, the DC inductor $L_{DC}$ smoothes the power flow such that the pick-up circuit and its tuning capacitor operate at a voltage directly proportional to the power output. At slower switching speeds the resonance between inductor $L_1$ and capacitor $C_1$ completely collapses when the switch is turned on for a long time and must be re-established when the switch is turned off again. Ideally the energy in the resonant circuit is maintained in $L_{DC}$ with current fly-wheeling through the switch and the rectifier bridge while the switch is on, but in practice this energy may be lost. Both fast and slow switching have power controlled by the duty cycle of the switch as noted above.

This method of control is easy to implement and has many desirable features. However, this pick-up controller does not operate with a unity power factor reflected back on the track, and the induced voltage in $L_1$ is not in phase with the current in $L_1$. In practice, therefore, the circuit is not as efficient as it might be, as the resistive losses in $L_1$ are always higher than ideal and ultimately set the power limit for the pick-up.

Unity power factor pick-ups may be achieved with series tuned pick-ups but these pick-ups result in a power surge on switch-on that is difficult to control. They are also potentially damaging in a short-circuit as the short-circuit currents that they produce may be of a very large magnitude.

A parallel tuned pick-up which achieves a unity power factor is shown in FIG. 3. This pick-up controller is described in International (PCT) Application No. PCT/NZ2007/000131, which is assigned to the assignee of the present invention. The topology of the circuit of FIG. 3 is similar to that of the circuit of FIG. 2, but the DC inductor of FIG. 2 has been replaced with a substantially smaller AC inductor in FIG. 3. An extra capacitor, $C_3$, has been added to compensate for the reactive loading of the rectifier.

This circuit is a considerable improvement on the circuit of FIG. 2, but at some cost. The circuit of FIG. 3 cannot be switched at a high speed as there is now no DC inductor to smooth the power flow from one switching cycle to the next. Also, the arrangement of FIG. 2 provides for a further switching option of switching slowly but then using a switching "burst" when the switch is turned on. At this time the current through $L_{DC}$ can be monitored and if it becomes too high, the switch may be temporarily switched off to recover this energy to the output capacitor, thereby improving efficiency, achieving a "softer" switching-on for the switch, and reducing circuit losses. These switching options are not possible with the unity power factor circuit of FIG. 3.

Switching characteristics are particularly important for higher power pick-ups and controllers. For example, in a pick-up rated at 25 kW, all 25 kW is turned on and off very sharply when the switch is operated. This may cause disruptions to the 3-phase power supply such that other users are affected. With very high power circuits, fast switching is also not attractive as circuits of this "boost" configuration type are not favoured at higher power levels.

SUMMARY OF THE INVENTION

It is an object of the invention to provide power control for an inductive power transfer pick-up that mitigates at least one of the aforementioned problems.

Alternatively, it is an object of the invention to provide at least a useful choice to the public.

According to a first aspect of the invention there is provided a circuit for a high-power pick-up controller, the circuit including:
  input means for coupling to a voltage source;
  processing means for producing an output signal based directly or indirectly at least in part on the voltage of the voltage source;
  output means; and
  switching means for selectively coupling the processing means to the output means so as to selectively provide the output signal to the output means.

While preferred embodiments of the invention are configured for use in high-power pick-up circuits, the scope of the invention is not limited thereto and embodiments thereof may be configured for use in pick-up circuits having any nominal power rating.

"Turned on" or "switched on" (or the like) as used hereinbelow refer to the switching means being configured to operably connect the processing means to the output means and provide the output signal. "Turned off" or "switched off" (or the like) as used hereinbelow refer to the switching means being configured so as to operably decouple the processing means and the output means so as to generate a zero output signal.

Preferably, the output signal is in the form of a current, more preferably, a DC current.

Preferably, the processing means is configured to convert the voltage from the voltage source to a current.

Preferably, the processing means includes means for reducing the magnitude of and/or rectifying the current output.

According to a second aspect, there is provided a controller for a high-power pick-up, the controller including a plurality of circuits according to the first aspect.

Preferably, the circuits are connected in parallel to the voltage source and/or the output means.

Preferably, the switching means of each circuit may be independently actuated, such that any number of the switching means may be switched on or off at any point in time.

Preferably, the controller is configured to control each switching means of the plurality of circuits so as to control the output voltage. More preferably, the controller is configured to control each switching means of the plurality of circuits so as to maintain the output voltage at a predetermined value. Thus, as the external load applied to the pick-up associated with the controller is varied, the output voltage may be maintained constant.

Preferably, the controller is adapted to synchronise operation of the switching means with the zero crossings of a single phase mains supply voltage.

According to particular embodiments, the controller is configured to measure or receive a measure of the output voltage. According to such embodiments, the number of switching means switched on is preferably proportional to the error (as shown in Table 1, i.e., the difference between a desired and actual output voltage).

Preferably, the controller is configured to employ a sequential switching strategy, whereby the thermal loads on the plurality of circuits of the first aspect are equalised.

Preferably, the controller is configured to cycle the load between redundant circuits.

According to particular embodiments, the pick-up under the control of the controller in use has a resonant frequency, which is substantially the same as the frequency of the open circuit voltage of the pick-up coil. The power supply, being an AC power supply, will also have an associated input frequency, referred to herein as the mains frequency although it will be appreciated that sources other than mains power sources may be used in conjunction with embodiments of the invention.

Preferably, the controller is configured to weight current drawn from each of the circuits of the first aspect, preferably so as to maintain a desired power factor (preferably a unity or near unity power factor). More preferably, the controller is configured to sine-weight the current drawn from each of the circuits at the mains frequency.

Preferably, the controller is configured to switch on and/or off circuits of the first aspect so as to produce a desired waveform fundamental while reducing harmonics. More particularly, according to preferred embodiments of the invention, the controller is configured to generate or receive switching angles which set the switch on and off times for each of the circuits.

According to a third aspect, there is provided an IPT pickup including a controller according to the second aspect and/or a circuit according to the first aspect.

According to a fourth aspect, there is provided an IPT system including an IPT pickup according to the third aspect and/or a controller according to the second aspect and/or a circuit according to the first aspect.

According to a fifth aspect, there is provided a method of controlling a high-power pick-up, the method including:
producing an output signal based directly or indirectly at least in part on an input voltage, wherein the input voltage is generated by inductive power transfer; and
selectively coupling the output signal to output means.
Preferably, the output signal is in the form of a current.
According to preferred embodiments, the output signal includes a plurality of component parts, each part being based on the input voltage and couplable to the output means.

Preferably, the method includes selectively coupling any number of the plurality of component parts to the output means.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

In broad terms, the invention provides for stepped/incremental changes in current provided by a high-power IPT pick-up so as to avoid large substantially instantaneous changes. The invention additionally or alternatively provides for wave-shaping of the current, so as to, for example, obtain a unity power factor.

Figure 4:
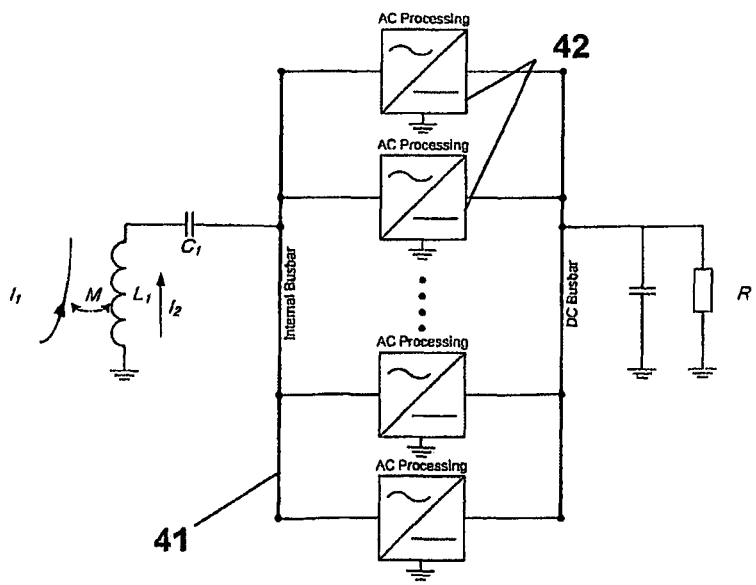
FIG. 4 is a diagram of an embodiment of an apparatus of the invention.

A high-power pick-up controller according to a preferred embodiment of the invention is shown in FIG. 4. The apparatus of FIG. 4 includes a pick-up inductor $L_1$ that is fully series tuned with capacitor $C_1$ to provide Internal Busbar 41 with an output voltage at the resonant frequency essentially the same as the open circuit voltage of the pick-up coil $V_{OC}$.

Internal Busbar 41 acts like a voltage source and would be dangerous if it were to be short-circuited. However, it is only ever used internally in the pick-up controller and so short-circuits are unlikely and easily protected against, in any event, with a simple fuse, if required.

Figure 5:
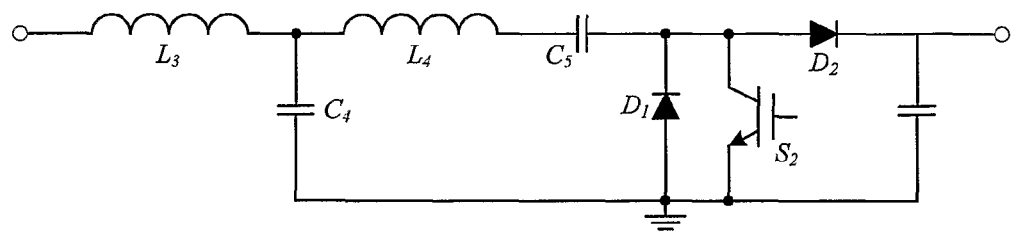
FIG. 5 is a diagram of an embodiment of the processing means of FIG. 4.

A number of processing means in the form of AC processing circuits 42 are connected to Internal Busbar 41. Circuits 42 are preferably all identical (although the scope of the invention is not limited thereto) and one possible embodiment thereof is shown in FIG. 5. A feature of the circuit is that all of the AC processing circuits 42 and the pick-up inductor $L_1$ share a common earth. Circuits 42 take as their input the voltage from Internal Busbar 41. The network of components $L_3$, $C_4$, and $L_4$ with capacitor $C_5$ converts this voltage from Internal Busbar 41 to a current output and the current divider formed by $D_1$, $S_2$ and $D_2$ rectifies this AC current output and reduces its magnitude before it is output. All AC processing circuits 42 are driven from Internal Busbar 41 and all of them are coupled to the output.

$L_3$, $C_4$, and $L_4$ in series with $C_5$ preferably all have essentially the same reactance, X, in each of the circuits 42. In these circumstances the AC current in $L_4$ is Internal Busbar 41 voltage $V_{OC}$ divided by X (A rms). The average DC current in $D_2$ when $S_2$ is off corresponds to the average value of the positive half cycles of the AC current, and is given by:

$$I_{D_2} = \frac{\sqrt{2} V_{OC}}{\pi X}$$

When switch $S_2$ is on, the average DC current in $D_2$ is 0. In practical implementations, the circuit of FIG. 5 or an equivalent circuit may be trimmed so that both switch states give the correct currents and no VAR load is reflected back on to the Internal Busbar. Without this trimming the rectifiers can cause small residual VAR loads but in most circumstances these may be neglected.

A feature of circuits 42 is that the output current is controlled by the input voltage (i.e., according to the embodiment shown, the voltage of Internal Busbar 41) and the input current is controlled by the output voltage so that as the Internal Busbar voltage remains constant, the output current remains constant, irrespective of the output voltage.

In an example practical application, if $V_{OC}$ was 300 V and X was 13.5 Ohms, the circuit of FIG. 5 would provide a switchable 10A supply into the output, corresponding to a switchable 3 kW output. For a 25 kW pick-up system, 8 circuits of the form of FIG. 5 would be connected in parallel and in the operation of the complete pick-up system these circuits would be switched on and off as required to maintain the output at 300 V DC as its external load varied. Thus the largest transient possible would correspond to a 3 kW load step rather than a 25 kW step.

To control the switching, one strategy would be to measure the output voltage and turn on currents in proportion to the output voltage. For example, a suitable scheme might be as shown in Table 1.

TABLE 1

| Output Voltage Range [V] | Number of circuits on (Transistor switch $S_2$ off) |
| --- | --- |
| Less than 288 | 8 (All on) |
| 288-291 | 7 |
| 291-294 | 6 |
| 294-297 | 5 |

TABLE 1-continued

| Output Voltage Range [V] | Number of circuits on (Transistor switch $S_2$ off) |
| --- | --- |
| 297-300 | 4 |
| 300-303 | 3 |
| 303-306 | 2 |
| 306-309 | 1 |
| Greater than 309 | 0 |

To equalise the thermal load on the circuits a sequential switching strategy may be used. For example, the circuit 42 that has been on for the longest time may be the next one to be turned off. Also the switching states may be sequentially clocked at, say, a rate of 100 Hz so that only one circuit is allowed to change state at any one time. For example, if the output voltage is low and there are presently only 2 circuits 42 on, then the number of circuits 42 on is increased by 1 each clock cycle, until it reaches the desired value (i.e., that shown in Table 1), so that there is no sudden power demand surge.

A further advantage of the multiple parallel paths of the present invention is possible due to the redundancy in having multiple parallel AC processing circuits 42 when the pick-up is not at full output power. This redundancy provides the ability to multiplex or interleave the current in inductors $L_3$ and $L_4$ of each circuit 42 by rotating or cycling the switching on/off sequence between all converters such that the required number of processing circuits 42 are continuously active, but the load is cycled between all, or at least a number, of the circuits 42. This may be referred to as macro-switching of the circuits 42. In this way, the load is shared between the circuits 42 instead of some number of circuits 42 operating at full power while other circuits 42 are permanently off. Thus the average current of each circuit 42 will be less and the losses in the pick-up are evenly distributed across all of the AC processing circuits 42, leading to thermal cycling and a higher apparent switching frequency leading to better regulation.

Figure 6:
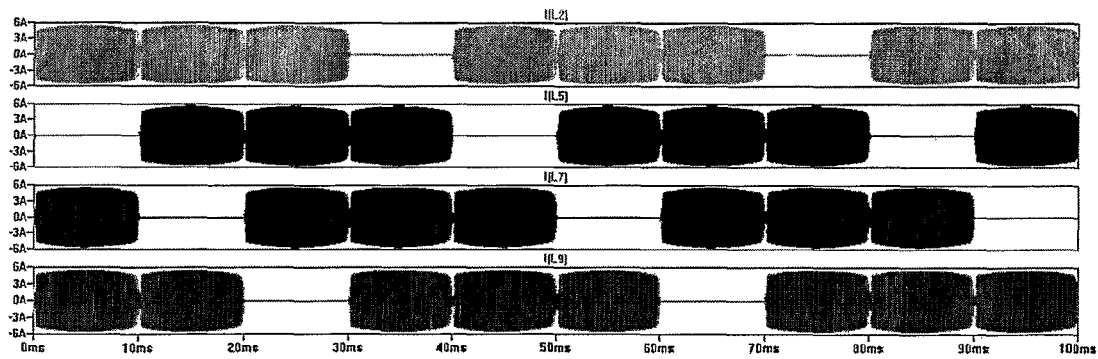
FIG. 6 shows waveforms illustrating an example multiplexing switching scheme.

Referring to FIG. 6, waveforms show the current in inductor $L_3$ of each of four AC processing circuits 42 in an example IPT pick-up controller implementing multiplexing or macro-switching according to the invention. It can be seen from FIG. 6 that each AC processing circuit 42 is active for only ¾ of the time, rather than three AC processing circuits 42 operating continuously while the fourth is off. Although the required number of circuits 42 are active at any time, the particular combination of active circuits 42 is varied. While in this example the circuits 42 are switched sequentially such that each circuit 42 is active for three consecutive cycles out of every four, any alternative switching scheme may be used without departing from the to scope of the invention. For example, the circuits 42 may be switched in a different or random sequence, or the particular circuits switched in and/or out may be dependent on temperature, for example.

The ideal number of parallel AC processing circuits 42 is a balance between cost and performance. More parallel circuits 42 provide for smoother control, but cost more, but in very high power circuits the parallel multi-processing allows much lower cost switches, inductors, and capacitors to be used. These circuits are easier to implement as leakage inductances are less critical in lower power circuits.

A separate application for the parallel processing AC circuit pick-up controller of embodiments of the invention concerns wave-shaping as described in International (PCT) Application No. PCT/NZ2007/000131, which is assigned to the assignee of the present invention and the entire contents of which are incorporated herein by way of reference.

Figure 1:
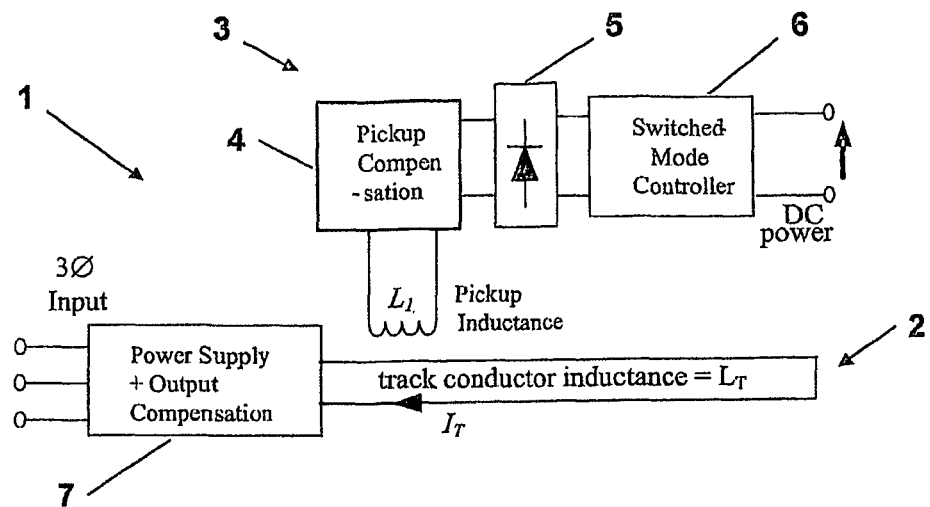
FIG. 1 is a schematic diagram of an IPT system according to the prior art.
Figure 2:
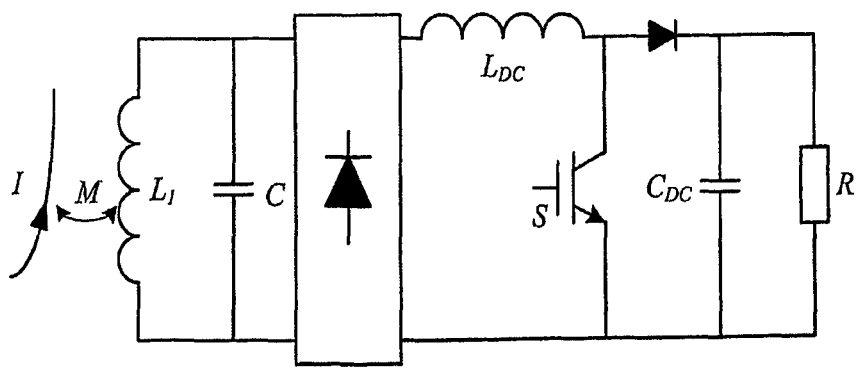
FIG. 2 is a diagram of a pick-up controller according to the prior art.
Figure 3:
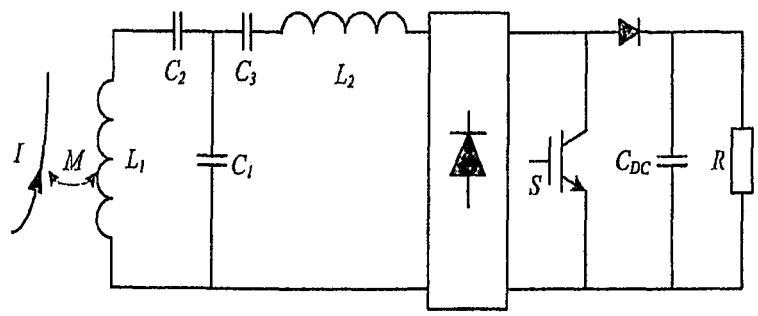
FIG. 3 is a diagram of a parallel tuned unity power factor pick-up according to the prior art.

It is desirable to obtain a unity power factor in the AC mains supply in, for example, a battery charger circuit driven from a single phase mains supply. The same circuits as those shown in FIGS. 4 and 5 may be used for this purpose. With a single phase source (i.e., Power Supply and Output Compensation block 7 in FIG. 1), Internal Busbar 41 of FIG. 4 has a modulated envelope at mains frequency imposed upon it. The single phase circuit is chosen at this power level as it is low cost and is by far the most common outlet.

Figure 7:
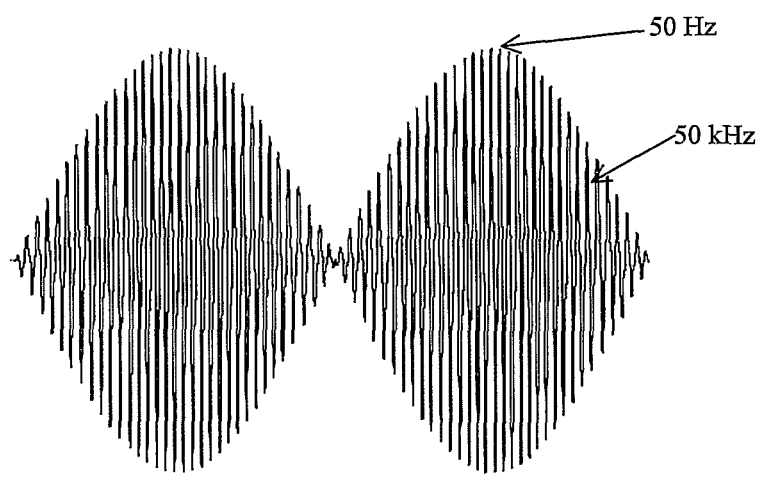
FIG. 7 is an example voltage waveform for the Internal Busbar of FIG. 4.
Figure 8:
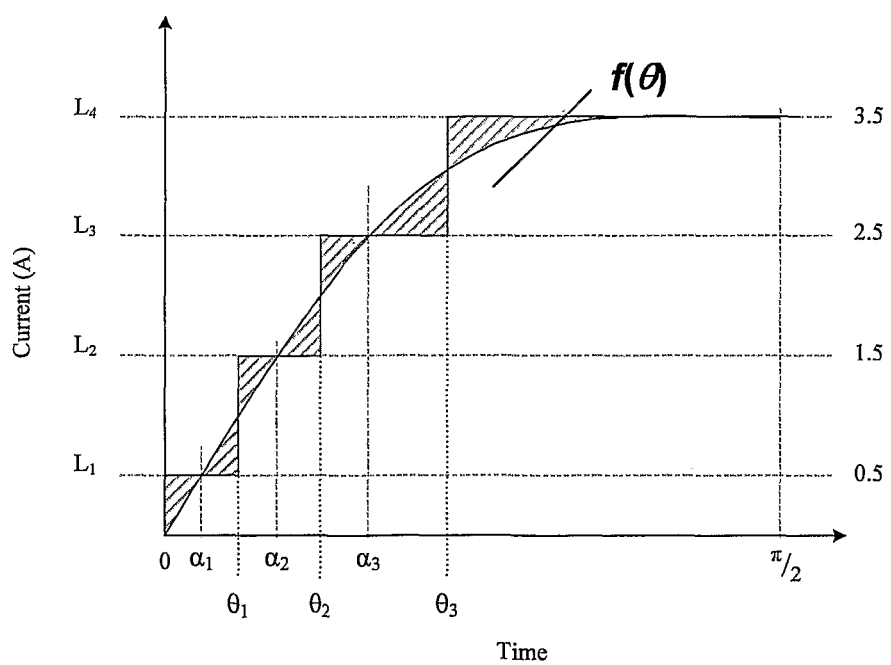
FIGS. 8 & 9 show partial and complete waveforms, respectively, illustrating an example switching pattern.

The voltage of Internal Busbar 41 in FIG. 4 now has the shape shown in FIG. 7. In this example the IPT frequency is 50 kHz and the (single phase) mains frequency is 50 Hz. According to a preferred embodiment, four AC processing circuits 42 are connected to the voltage source having the waveform shown in FIG. 7. The first one is continuously on and maintains the whole circuit from the mains input rectifiers to the output in continuous conduction. In practice a half step is sufficient for this. The three other circuits are switched on to maintain as closely as possible the sinusoidal waveshape but using only fixed current levels, referred to as 'micro-switching' of the AC processing circuits for sub-cycle wave-shaping. An example micro-switching pattern is shown in FIG. 8. As the output voltage is constant (DC), the input current to each circuit 42 is constant but to get a unity power factor, the current taken therefrom must be sine-weighted at the mains frequency. In FIG. 8 this wave-shape is achieved using a half-rated current circuit which is permanently on, and three switched circuits, all switching the same full rated currents. Switching angles $\theta_1$, $\theta_2$, and $\theta_3$ are chosen to produce the required waveform fundamental while at the same time reducing the harmonics as much as possible. Since these harmonics propagate back to the power system they are subject to regulations that must be met. Consequently, the ability to control them is important. In the example shown, a waveform with a fundamental peak value of 4 is produced, even though the waveform itself only has a maximum value of 3.5, by taking advantage of the fact that a significant fraction of $3^{rd}$ harmonic content is allowable.

In this example, the generating waveform is:

$$f(\theta)=4 \sin \theta + 0.5 \sin 3\theta$$

Figure 9:
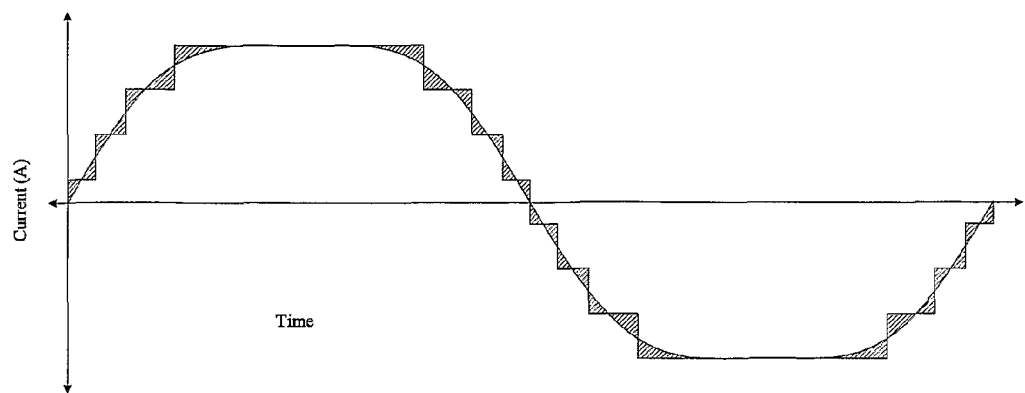

The levels that are possible are 0.5, 1.5, 2.5, and 3.5. The angles $\alpha_1$, $\alpha_2$, and $\alpha_3$ are the instants where f(θ) crosses the possible levels. The angles $\theta_1$, $\theta_2$ and $\theta_3$ are preferably chosen so that the area under the f(θ) curve between the respective a values is exactly the same as the area under the switched waveform. In this way a waveform with transitions at $\theta_1$, $\theta_2$ and $\theta_3$ is produced which has a fundamental component with third harmonic distortion matching that of the continuous line f(θ) shown in FIG. 8. By introducing small amounts of third harmonics, various fundamental harmonic magnitudes can be achieved even though the amplitude of the step waveform is fixed. The total harmonic distortion at higher harmonics (above third harmonic) is represented by the hashed area in FIG. 8. As shown the total introduced harmonic distortion is small and the power factor for the example waveform shown is approximately 0.987. The waveform produced is shown over a complete cycle in FIG. 9. For this waveform, all of the harmonics up to the $19^{th}$ are listed in Table 2.

TABLE 2

| Harmonic component | Magnitude (%) |
| --- | --- |
| 1 | 100 |
| 3 | 12 |
| 5 | 1 |

TABLE 2-continued

| Harmonic component | Magnitude (%) |
| --- | --- |
| 7 | 1 |
| 9 | 1.5 |
| 11 | 1 |
| 13 | 2 |
| 15 | 0.5 |
| 17 | 2 |
| 19 | 0.5 |

As shown the harmonics are all small and do not pose difficulties. The distortion power factor of this waveform is 0.987 including the deliberately introduced $3^{rd}$ harmonic and if this is ignored, the distortion power factor is 0.99.

While the above example has been described as having 4 levels, preferred embodiments of the invention may be provided with a higher number of levels so as to further improve the distortion power factor.

In practical applications, the number of parallel paths that are used may also be determined by the power required and the magnitude of the voltage of the Internal Busbar. Thus, for a high Internal Busbar voltage, the current produced by each parallel path is high and only a small number of paths need to be used. This number of paths may be independently determined to suit the peak power flow required and the technique described herein allows this peak to correspond to the peak of a sinewave current in the mains input to the power supply giving unity power factor on the mains input to a single phase power supply. For example, if the peak Internal Busbar voltage is 400 V then for a power flow of 2 kW the peak current from the Internal Busbar will need to be 20 A. If each parallel path takes 5 A in these circumstances, then the equivalent of 4 parallel paths would need to be in use at the peak power condition and these circuits are controlled in the manner shown in FIG. 8 to give sinewave weighted currents as required, using 3 paths with a weighting of 1 and one with a weighting of 0.5. Other power flows are easily accommodated to suit variations in the power required and variations in the peak Internal Busbar voltage.

This power flow of 2 kW will then produce an input current to the power supply of ideally 8.7 A rms (2 kW/230V). In practice, a slightly higher current will be needed to overcome system losses, but the power factor will remain high.

Modifications to the power controller may be made in accordance with the requirements of a particular application. An alternative preferred AC processing circuit 42 is shown by way of example in FIG. 10. In this embodiment, the circuit 42 includes the same LCL tuned network comprising the inductors $L_3$ and $L_4$ and capacitor $C_4$, but the rectifying circuit may comprise a voltage multiplier such as the voltage doubler shown comprising capacitors $C_6$, $C_7$, and $C_{DC}$, and diodes $D_1$ and $D_2$.

Figure 10:
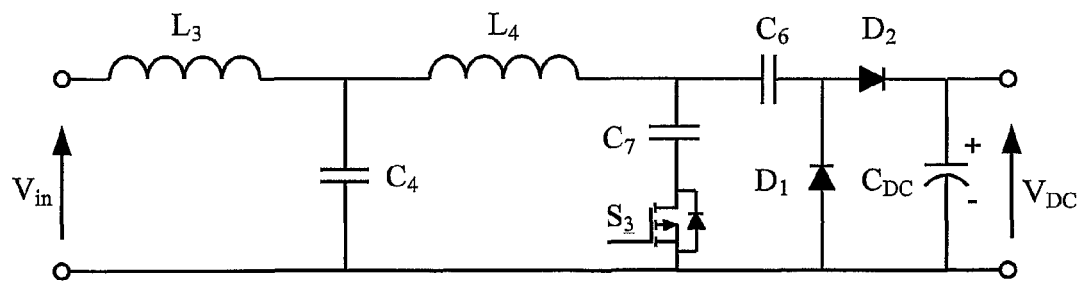
FIG. 10 is a diagram of a converter means including a voltage multiplier according to one embodiment of the invention.

The voltage multiplier converts the AC current source from the LCL network to a higher DC voltage. In the case of the voltage doubler as illustrated in FIG. 10, the DC output voltage $V_{DC}$ is greater than the AC output voltage of the LCL network by a factor of $\pi/\sqrt{2}$. The current flow through inductor $L_3$ is determined by the output voltage $V_{DC}$ (divided by $\pi/\sqrt{2}$) divided by the characteristic impedance Y of the LCL network and vice versa for the current flow through $L_4$. As the AC processing circuits 42 are provided in parallel, the current $I_2$ in the pick-up coil $L_1$ is the summation of the current flows in the $L_3$ inductors of each circuit 42.

The DC shunt switch $S_3$ is provided to allow control of the AC processing circuit 42 and is shunted by an inverse parallel diode to protect the switch from reverse currents.

The performance of a power controller according to the present invention in the pick-up circuit of an IPT system will be described below with reference to an example. Referring to FIGS. 4 and 10, the example pick-up circuit has three AC processing circuits 42 and the design parameters listed in Table 3.

TABLE 3

| $L_1$: | 59.15 uH | $C_6$: | 0.08 uF |
|---|---|---|---|
| $C_1$: | 0.146 uF | $C_7$: | 0.3 uF |
| $L_3$: | 127 uH | Frequency: | 50 kHz |
| $L_4$: | 147.8 uH | | |

Figure 11:
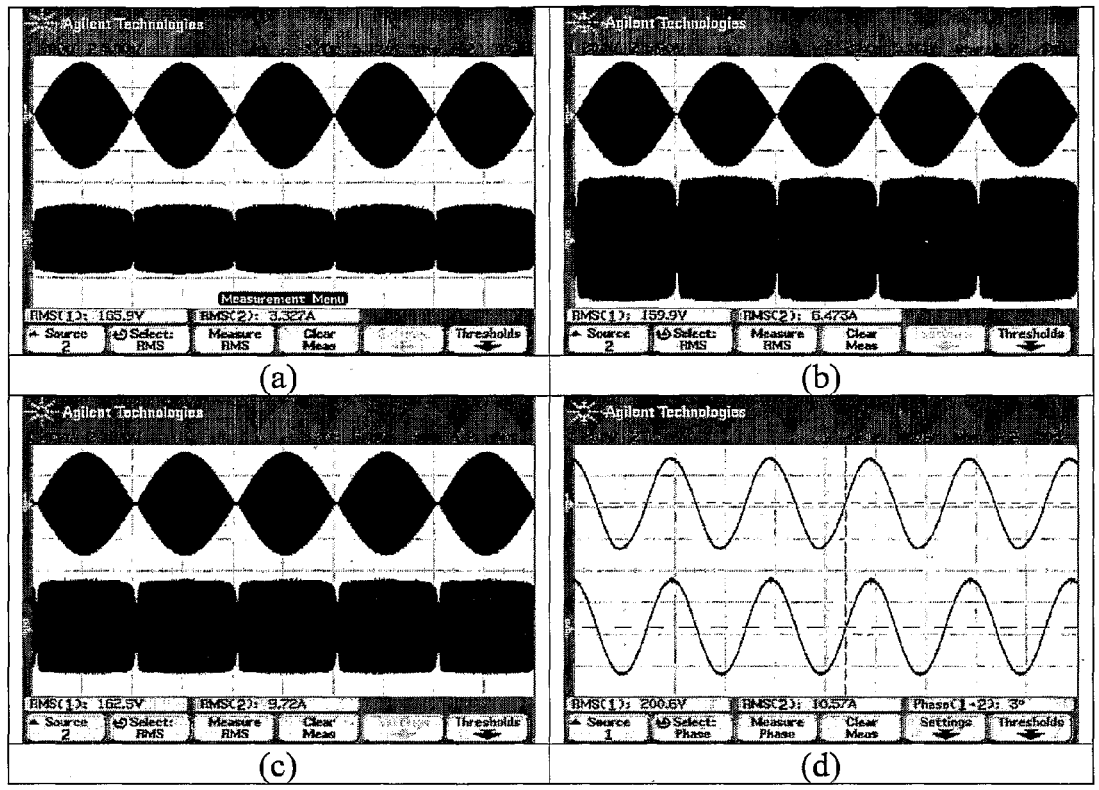
FIG. 11 shows waveforms of the voltage and current at the internal busbar of a pick-up controller having three parallel AC processing circuits, at (a) 460 W, (b) 920 W, and (c) and (d) 1.4 kW output power.

FIG. 11 shows the waveforms of the internal busbar voltage ($V_{OC}$) and pick-up coil current $I_2$ with (a), one, (b) two, and (c) three AC processing circuits 42 operating with a DC output voltage of 300V. FIG. 11(d) shows a closer view of the waveforms of FIG. 11(c). Each circuit 42 delivers approximately 460 W with a $V_{OC}$ of 160V. With all three circuits 42 switched on, 1.4 kW of power is delivered to the load R. This demonstrates that the pick-up current $I_2$ is directly proportional to the number of AC processing circuits 42. With a single circuit 42 active as shown in FIG. 11(a), the pick-up current $I_2$ is 3.3 A and with all three circuits 42 active as shown in FIG. 11(c), the pick-up current $I_2$ is 9.72 A. The increased number of activated AC processing circuits 42 barely affects the Internal Busbar voltage or the power factor of the pick-up coil. The power factor is essentially unity regardless of the number of AC processing circuits 42 activated.

Figure 12:
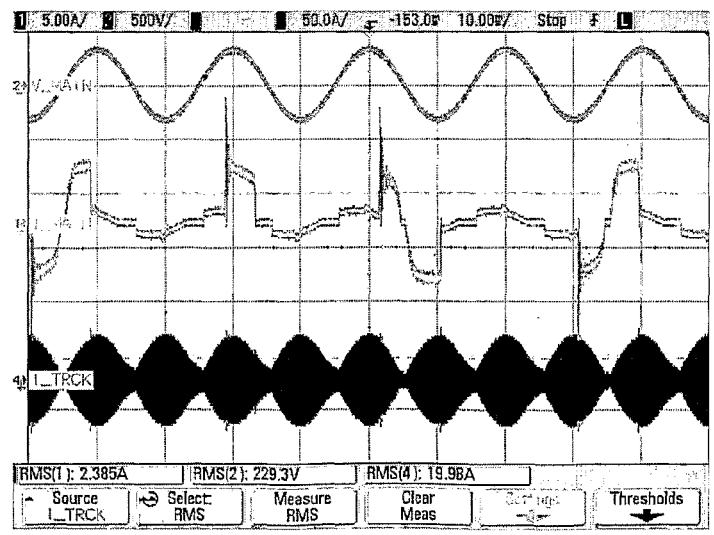
FIG. 12 shows waveforms of supply voltage, supply current, and track current, respectively, for a conventional parallel-tuned pick-up circuit coupled with a single-phase AC power supply.

As previously discussed, one disadvantage of pick-up controllers according to the prior art is switching losses and transient overshoot in the pick-up current $I_2$, which occurs as a result of switching the circuit on and/or off. The pick-up current overshoot will reflect back to the power supply and cause distortions on the grid, particularly if the power supply has minimal or no DC storage. This phenomenon can be observed in FIG. 12, where waveforms are shown for a conventional parallel-tuned slow-switching pick-up used with an AC power supply having a single phase input. FIG. 12 shows the mains voltage (top waveform), mains current (middle waveform), and pick-up coil current $I_2$ (bottom waveform). It can be seen from these waveforms that the mains current of the conventional pick-up circuit has a relatively large transient overshoot and harmonic distortion. A mains filter would normally be required to remove this distortion.

As described herein above, the present invention already has an advantage in that the largest transient corresponds with switching only a single AC processing circuit 42, rather than the entire circuit. However, transients may be further minimised in IPT systems receiving power from a single-phase AC input, as will be described in further detail below.

In one example application of a pick-up including a parallel path controller according to the present invention, the pick-up may be inductively coupled with a primary conductive path energised by an amplitude-modulated power supply with a single-phase AC input, as described by way of example in the applicant's International Publication No. WO2007/100265 entitled "Single phase power supply for inductively coupled power transfer systems", the content of which is herein incorporated by reference. In this application, the internal busbar voltage $V_{OC}$ is reduced to near-zero at the mains voltage zero-crossing point. This provides an opportunity to activate or deactivate one or more of the AC processing circuits 42 with minimal switching loss and transient overshoot in the pick-up coil current $I_2$ by synchronizing the switching with the mains voltage zero-crossing points. Thus, the pick-up controller may be provided with a switching control means adapted to control the timing of switching the AC processing circuits 42 on and/or off. Where the switching states are sequentially clocked as described herein above, the switching frequency is therefore related to the mains supply frequency with the leading and trailing edges of the clock signal synchronised with the zero-crossing of the mains voltage. Accordingly, the switching control means may therefore include a phase locked loop (PLL), phase detector, or any other suitable means for synchronizing the switching with the zero-crossing of the mains supply voltage zero-crossing.

Figure 13:
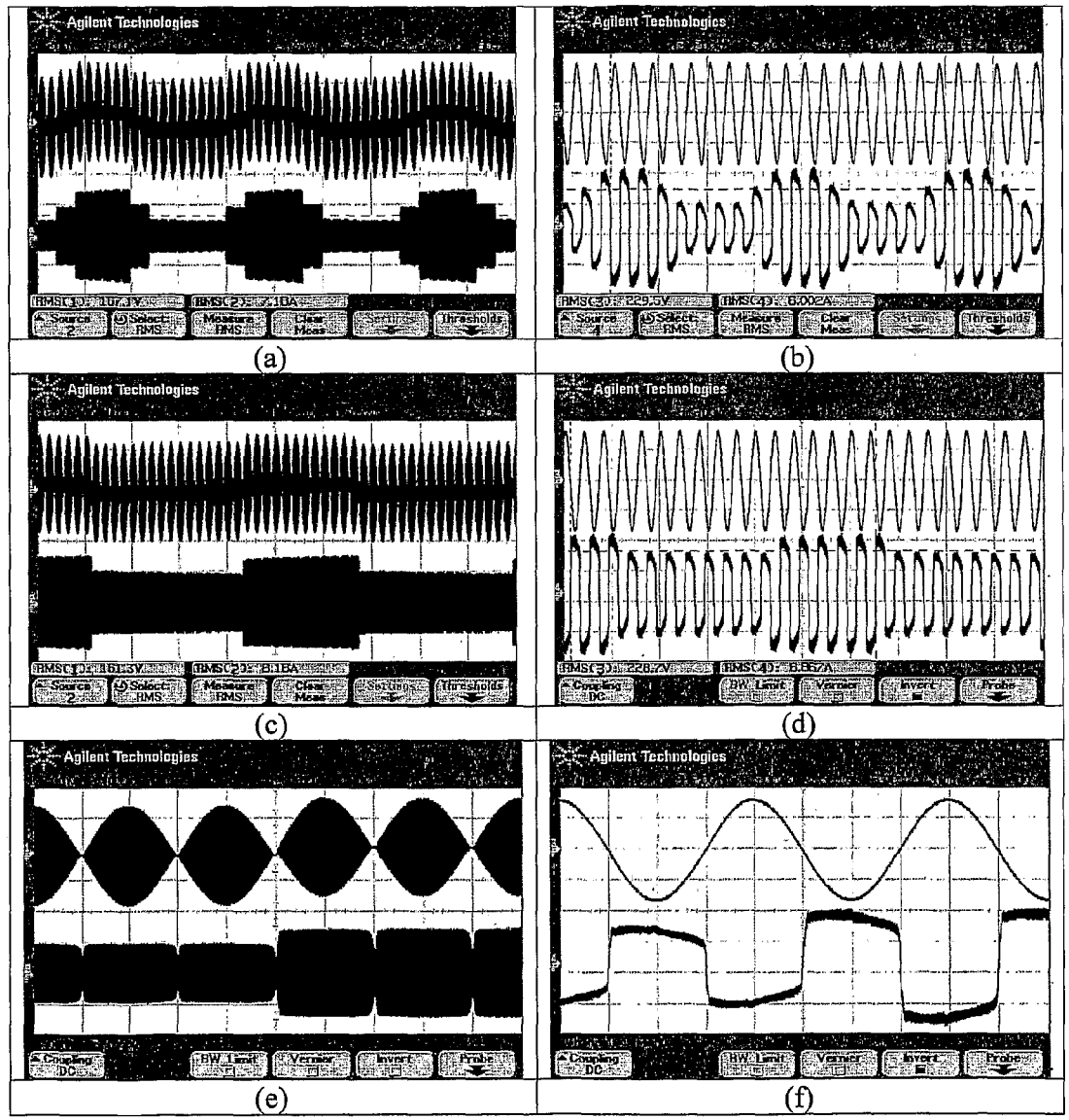
FIG. 13 shows waveforms of (a) voltage and current of the first internal busbar at an output power of 880 W, (b) mains voltage and current at output power of 880 W, (c) voltage and current of the first internal busbar at output power of 1.1 kW, and (d) mains voltage and current at output power of 1.1 kW, with (e) and (f) showing closer views of the waveforms of (c) and (d), respectively.

Waveforms of the first internal busbar voltage and current are shown in FIGS. 13(a), (c) and (e), with the corresponding mains supply voltage and current waveforms shown in FIGS. 13(b), (d) and (e) for a parallel path pick-up controller including a switching control means to synchronise switching of the AC processing circuits. 42 with the zero-crossing of the mains supply voltage. The waveforms of FIGS. 13(a) and (b) are for an output power of 880 W, while FIGS. 13(c)-(f) are for an output power of 1.1 kW. FIGS. 13(e) and (f) show a closer view of the waveforms of FIGS. 13(c) and (d). From FIG. 13 it can be seen that with the switching control means, the pick-up and mains voltage and current waveforms are very "clean" and substantially free from distortion. This can be seen especially in FIGS. 13(e) and (f) during the transition from two to three activated AC processing circuits 42. The waveforms show that there is no transient overshoot or harmonic distortion in the mains current.

A further advantage of the parallel path pick-up controller according to the present invention is that unlike the series-tuned pickups of the prior art, the current $I_2$ in the pick-up coil $L_1$ can be directly controlled without any additional control scheme.

If the pick-up coil $L_1$ is short-circuited, a current $I_{SC}$ flows through it. In the operation of the parallel path pick-up, the pick-up coil $L_1$ is in series with a compensation capacitor $C_1$ and a number of parallel paths or AC processing circuits 42. The current $I_2$ in the pick-up coil $L_1$ is always greater than the short circuit current $I_{SC}$ and the ratio between the two is conveniently called the current Q, or current quality factor for the circuit, given by the following equation:

$$Q_I = \frac{I_2}{I_{SC}}$$

Figure 14:
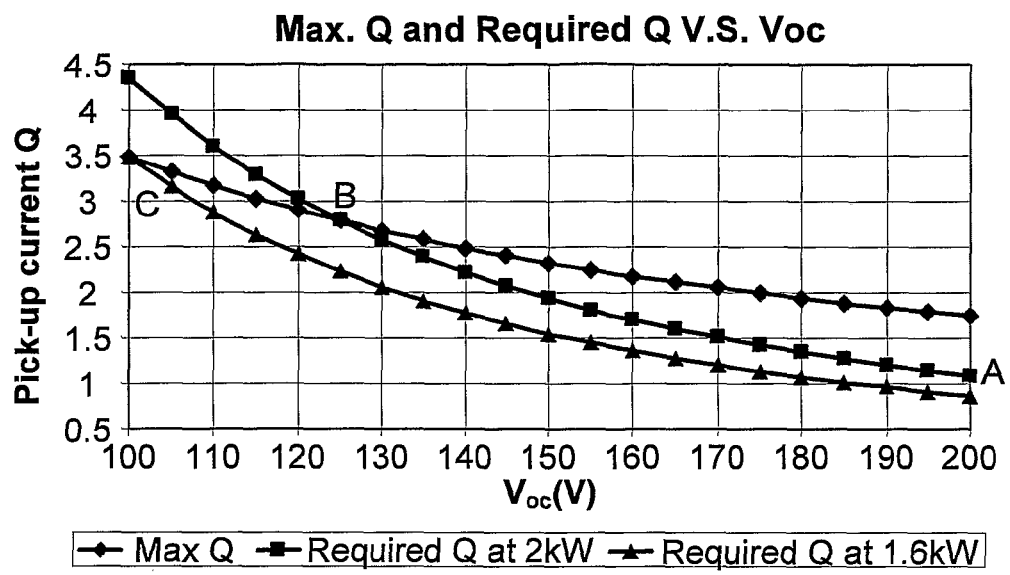
FIG. 14 is a graph of simulated pick-up current and delivered power for a pick-up controller including 20 parallel AC processing circuits.

In the parallel path pick-up controller of the present invention, the pick-up coil current $I_2$ is the summation of the current flow in the inductor $L_3$ of the LCL network 20 in AC processing circuit 42. In other words, by controlling the AC processing circuits 42, the pick-up coil current $I_2$ is directly controlled. As the pick-up coil $L_1$ is preferably series tuned or compensated, the parallel path pick-up topology has the same practical limit as the conventional series-tuned buck converter pick-up, being the limitation of pick-up current Q. For a conventional series tuned pick-up, the current Q ($Q_1$) increases with the load current. However there is no direct control of the current Q in the buck converter topology. Often a separate current control scheme is required to limit the pick-up current Q to prevent the pick-up coil current $I_2$ exceeding the rating of the tuning capacitor $C_1$, for example by detuning the resonant circuit as described in the applicant's International Publication No. WO 2004/105208 entitled "Methods and apparatus for control of inductively coupled power transfer system". According to the present invention, the current Q may be limited by controlling the pick-up coil current $I_2$, at the cost of also limiting the maximum output power capability, should the need arise Referring again to the parallel path pick-up design of Table 3 and FIGS. 4 and 10, the required current Q for outputting 2 kW and 1.6 kW is plotted in FIG. 14 with the maximum current Q allowed in this design. The maximum current Q is calculated based on the current limit of the chosen tuning capacitor $C_1$. It can be seen that the required Q for outputting 1.6 kW is lower than the maximum Q value for voltages $V_{OC}$ at the internal busbar of between 100V to 200V. The required Q for 2 kW power output is lower than the maximum current Q for busbar voltages $V_{OC}$ between 125V and 200V; however, between 100V to 125V the required current Q is higher than the allowable maximum. Therefore, the 2 kW multi-path pick-up should operate along the required Q curve from point A to point B between 200V to 125V Voc. Between 125V to 100V $V_{OC}$, the pick-up will operate along the maximum Q curve from point B to point C, at the cost of not being able to supply the required 2 kW output power.

According to the preferred embodiment of the invention, the shunt switch $S_3$ of FIG. 10 is replaced by a series AC switch. With the shunt switching topology shown of FIG. 10, the output DC load is disconnected from the respective AC processing circuit 42 when the switch $S_3$ is shorted. While the switch $S_3$ is turned on, there is no current flow in inductor $L_3$ since there is no load. However, the current in $L_4$ stays the same as it is determined by the input voltage to the AC processing circuit 42, $V_{in}$. This generates unnecessary copper and iron loss in the inductor $L_4$ while the processing circuit 42 is inactive.

Figure 15:
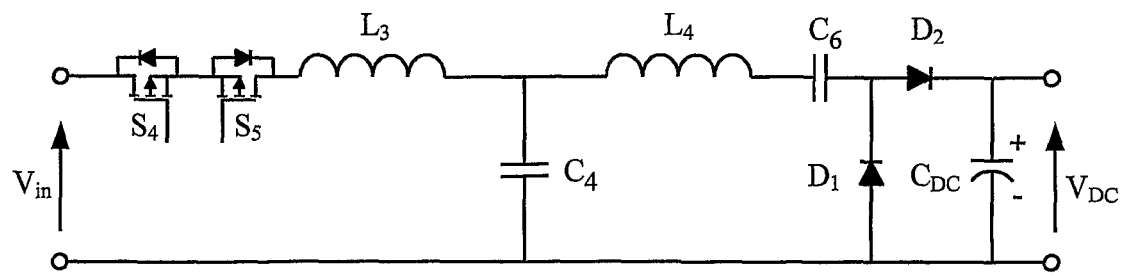
FIG. 15 is a circuit diagram of an alternative processing means including a series switch according to one embodiment of the invention.

Since the pick-up coil $L_1$ is series tuned with the tuning capacitor $C_1$, an AC series switch in front of the LCL network 20 can be used to disconnect the AC processing circuit 42 from the internal busbar, as shown in FIG. 15. An AC series switch, shown by way of example as comprising two n-channel MOSFET switches $S_4$ and $S_5$ cascaded together and shunted by respective inverse parallel diodes, replaces the shunting switch $S_3$ provided between the LCL network and the voltage doubler as shown in FIG. 10. The advantage of this configuration is that when an AC processing circuit 42 is disconnected or decoupled by opening the AC switch, no current flows in any of the components, and the circuit 42 is isolated from the AC voltage of the internal busbar.

Figure 16:
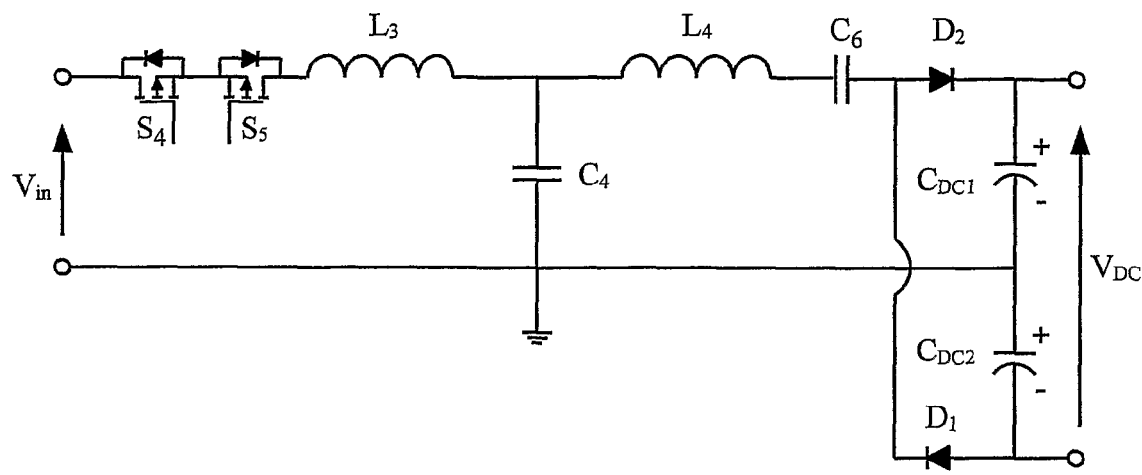
FIG. 16 is a circuit diagram of a processing means including a symmetric voltage multiplier.

One consequence of the AC processing circuits 42 as discussed above is that each of the processing circuits 42 introduces a DC offset to the internal busbar voltage $V_{OC}$. This is caused by the unsymmetrical structure of the voltage multiplier. The node after the second inductor $L_4$ in the LCL network is free to have a DC bias, as there is no DC path for the current. With an AC voltage input, the LCL network outputs a positive DC voltage relative to the common ground. This introduced DC offset voltage creates extra voltage stress across the switches and also makes it harder to detect the mains voltage waveform as the internal busbar voltage $V_{OC}$ is no longer centered to the common ground. According to one embodiment of the invention, a rectifier providing a symmetrical output voltage from the AC processing circuit 42 may be used as shown in FIG. 16 to address this issue.

Figure 17:
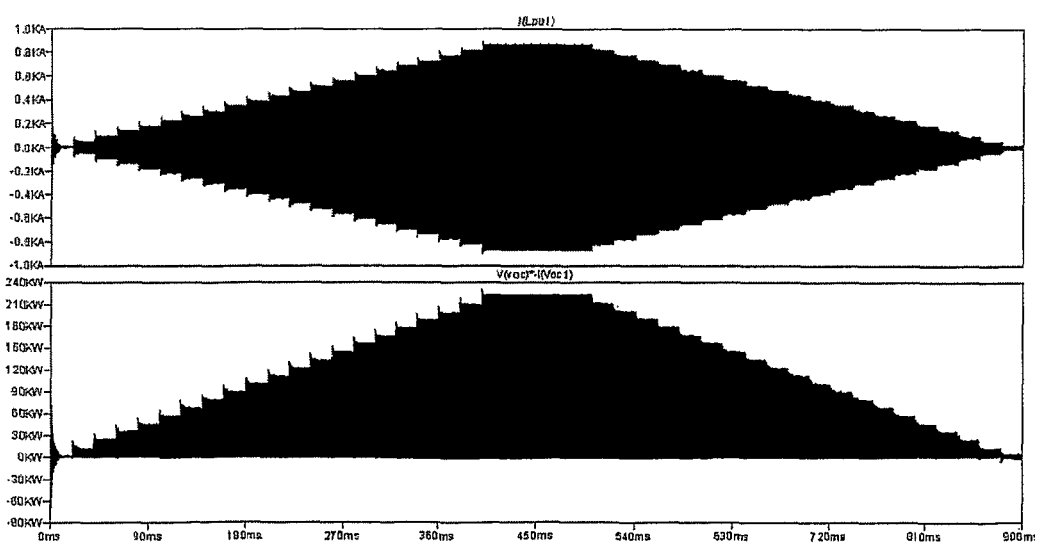
FIG. 17 shows waveforms of pick-up current and delivered power for a pick-up controller including 20 parallel processing circuits according to one embodiment of the present invention.

The results of simulations of a parallel path pick-up controller including twenty parallel AC processing circuits 42, each rated at 5 kW and including a rectifier with a symmetrical output voltage, are shown in FIG. 17. Here the track current $I_1$ is a constant AC current with no amplitude modulation. The top trace of FIG. 17 shows the current $I_2$ in the pick-up coil $L_1$, with the lower trace showing the power delivered to the load. Both the pick-up current $I_2$ and the delivered power increase in discrete steps as each of the twenty AC processing circuits 42 are successively turned on. This allows the power drawn from the power supply to be ramped up to full power and back to zero, or anywhere in between, in 5 kW steps. As previously described, this is advantageous as the smaller load steps cause less impact on the power supply than decoupling the entire pick-up in one instant by switching full power (100 kW) on and off.

It should be further noted that various changes and modifications to the presently preferred embodiments described herein will be apparent to those skilled in the art. Such changes and modification may be made without departing from the spirit and scope of the invention and without diminishing its attendant advantages. It is therefore intended that such changes and modifications be included within the scope of the invention.

From the foregoing it will be seen that a multi-path pickup controller circuit, an inductive power transfer system, and a method of controlling inductive power transfer are provided which offer a number of advantages over the prior art, including but not limited to high output power, high efficiency, reduced component rating requirements, minimised switching losses and transients, reduced stress on components, and controllable current Q. The controller therefore has the advantages of a conventional series-tuned pick-up apparatus, including unity power factor on the input, without the disadvantages of a start-up power surge and no control over the maximum possible current in the pick-up coil.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of the common general knowledge in the field.

The invention claimed is:

1. A pick-up circuit for an inductive power transfer (IPT) system comprising a series-tuned pick-up coil and a plurality of parallel AC processing circuits provided between the series-tuned pick-up coil and an output, each processing circuit being adapted to produce an output signal based directly or indirectly at least in part on a voltage of the series-tuned pick-up coil and comprising a switch for selectively coupling the processing circuit to the output so as to selectively provide the respective output signal to the output of the pick-up circuit.

2. The pick-up circuit of claim 1 wherein the series-tuned pick-up coil forms a voltage source and each processing circuit is configured to convert an AC voltage from the voltage source to a DC current source output signal.

3. The pick-up circuit of claim 1 wherein the switch of each circuit may be independently actuated, such that any number of the switches may be switched on or off at any point in time.

4. The pick-up circuit of claim 1, wherein the number of processing circuits coupled to the output at any time is proportional to the instantaneous power requirement of a load associated with the output of the pick-up circuit.

5. The pick-up circuit of claim 1, further comprising a controller configured to control each switch of the plurality of processing circuits.

6. The pick-up circuit of claim 5, wherein the controller is configured to control each switch of the plurality of processing circuits so as to maintain the output voltage at, or substantially equal to, a predetermined value whereby a substantially constant output voltage is maintained as an external load associated with the output of the pick-up circuit varies.

7. The pick-up circuit of claim 5, wherein the controller is configured to employ a sequential switching strategy, whereby thermal loads on at least two of the plurality of processing circuits are equalized.

8. The pick-up circuit of claim 5, wherein the controller is configured to cycle a load between redundant processing circuits.

9. The pick-up circuit of claim 5, wherein the controller is configured to synchronize actuation of the switches with the zero voltage crossings of a single phase mains power supply input to a power supply of the IPT system.

10. The pick-up circuit of claim 5, wherein the controller is configured to weight current drawn from each of the processing circuits so as to maintain a desired power factor.

11. The pick-up circuit of claim 10, wherein the controller is configured to approximate a sinusoidal waveform in the output signal.

12. The pick-up circuit of claim 5, wherein the controller is configured to switch on and/or off processing circuits so as to produce a desired output waveform fundamental while reducing harmonics.

13. An inductive power transfer (IPT) system including the IPT pick-up circuit according to claim 1.

14. A method of controlling a pick-up in an inductive power transfer (IPT) system, the method comprising the steps of:
providing a plurality of parallel AC processing circuits, each adapted to produce an output signal based directly or indirectly at least in part on an input voltage, wherein the input voltage is generated by inductive power transfer; and
selectively coupling any number of the output signals to an output of the pick-up.

15. The method of claim 14, wherein the output signal is in the form of a current.

16. The method of claim 14, wherein the number of output signals coupled to the pick-up output is proportional to the power requirement of a load associated with the pick-up output.

17. The method of claim 14, wherein the particular combination of processing circuits coupled to the pick-up output is varied to cycle a load between redundant processing circuits.

18. The method of claim 14, wherein the number of processing circuits coupled to the pick-up output is varied to approximate a desired output waveform fundamental.

19. The method of claim 14, wherein the coupling and/or decoupling of the processing circuits is synchronized with the zero voltage crossings of a single phase mains power supply input to a power supply of the IPT system.

\* \* \* \* \*